(12) United States Patent
Matsumoto et al.

(10) Patent No.: US 7,023,964 B2
(45) Date of Patent: Apr. 4, 2006

(54) COMMUNICATION SYSTEM

(75) Inventors: Masaharu Matsumoto, Kawasaki (JP);
Shigehiko Yazawa, Tokyo (JP);
Kazushige Haruta, Kawasaki (JP);
Hiroshi Ozawa, Tokyo (JP); Yoshiharu Kano, Tokyo (JP); Takashi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 09/746,495

(22) Filed: Dec. 21, 2000

(65) Prior Publication Data

US 2001/0025314 A1   Sep. 27, 2001

(30) Foreign Application Priority Data

Mar. 24, 2000 (JP) ............................. 2000-088520

(51) Int. Cl.
*H04M 1/64* (2006.01)
*H04M 3/42* (2006.01)

(52) U.S. Cl. ............... 379/67.1; 379/88.01; 379/88.19; 379/201.01; 379/201.06; 379/201.07; 379/201.11; 379/207.12

(58) Field of Classification Search ............... 709/200, 709/204, 223, 224, 227; 379/88.17, 88.18, 379/67.1, 88.01, 88.19, 201.01, 201.06, 201.07, 379/201.11, 207.12, 88.2, 88.21
See application file for complete search history.

(56) References Cited

U.S. PATENT DOCUMENTS

| | | | | |
|---|---|---|---|---|
| 5,652,789 A | * | 7/1997 | Miner et al. | 379/201.01 |
| 5,822,418 A | * | 10/1998 | Yacenda et al. | 379/201.07 |
| 6,108,704 A | * | 8/2000 | Hutton et al. | 709/227 |
| 6,343,115 B1 | * | 1/2002 | Foladare et al. | 379/88.17 |
| 6,389,127 B1 | * | 5/2002 | Vardi et al. | 379/209.01 |
| 6,842,505 B1 | * | 1/2005 | Suder et al. | 379/88.01 |

FOREIGN PATENT DOCUMENTS

| | | |
|---|---|---|
| JP | 6-31260 | 4/1994 |
| JP | 10-207938 | 8/1998 |
| JP | 11-39570 | 2/1999 |

* cited by examiner

*Primary Examiner*—Allan Hoosain
(74) *Attorney, Agent, or Firm*—Katten Muchin Rosenman LLP

(57) ABSTRACT

Disclosed is a communication system which improves the system flexibility and serviceability by efficiently controlling presence information. A presence inquiring section makes an inquiry about a presence state of a communicating party. A presence information receiving section receives presence information. A presence information display section displays the received presence information. A presence determining section determines the presence state. A presence information generating section generates the presence information. A presence information sending section sends the presence information upon reception of the inquiry.

20 Claims, 18 Drawing Sheets

```
                                          ┌─ 70 SCHEDULE INFORMATION
                                          │
┌─────────────────────────────────────────────────────────┐
│                                          00/10/6 PM13:26│
│                                                         │
│  CALLER: XXX                                            │
│                                                         │
│  RECEIVER: YYY                                          │
│                                                         │
│  TERMINAL STATUS:                                       │
│       ABSENT (SCREEN SAVER ON FOR 30 MINUTES)           │
│                                                         │
│  SCHEDULE OF YYY                                        │
│                                                         │
│       10/6   13:00 - 17:00  MEETING                     │
│       10/7    9:00 - 18:00  BUSINESS TRIP               │
│                                                         │
│                                                         │
│  EMERGENCY CALL: 090-1234-5678 (PORTABLE TELEPHONE)     │
│                                                         │
└─────────────────────────────────────────────────────────┘
```

FIG. 10

COMMUNICATION SYSTEM

BACKGROUND OF THE INVENTION

1. Field of the Invention

The present invention relates to a communication system, and, more particularly, to a communication system which controls communication of information about whether or not a third party is present over a network.

2. Description of the Related Art

Today communication networks are demanded of multifarious functions and the network structures are becoming complex and enormously larger. There are growing demands that a caller wants, beforehand, presence information indicating whether or not a communicating party is on such a communication network.

Prior art that is associated with control on presence information is disclosed in, for example, Japanese Unexamined Patent Publication (KOKAI) No. 207938/1998. This prior art places a server on a network to manage presence information.

The prior art controls presence information of only those terminals that are registered in the server which executes centralized management of presence information, and does not provide flexible control on presence information among terminals which are not registered in the server. That is, the prior art suffers poor flexibility and serviceability.

In addition, the conventional control of presence information reflects no considerations on exchange services, such as a multiline reception capability and pickup response capability.

SUMMARY OF THE INVENTION

Accordingly, it is an object of the present invention to provide a communication system which improves the system flexibility and serviceability by efficiently controlling presence information.

To achieve the above object, according to one aspect of this invention, there is provided a communication system which performs communication control on information indicating whether or not any third party is present over a network. This communication system comprises a caller communication terminal equipment having presence inquiring means for making an inquiry about a presence state of a communicating party, presence information receiving means for receiving presence information and presence information display means for displaying the received presence information; and a receiver communication terminal equipment having presence determining means for determining the presence state, presence information generating means for generating the presence information and presence information sending means for sending the presence information upon reception of the inquiry.

The above and other objects, features and advantages of the present invention will become apparent from the following description, when taken in conjunction with the accompanying drawings which illustrate preferred embodiments of the present invention by way of example.

BRIEF DESCRIPTION OF THE DRAWINGS

FIG. 10 is a diagram exemplifying schedule information;

DESCRIPTION OF THE PREFERRED EMBODIMENTS

Figure 1:
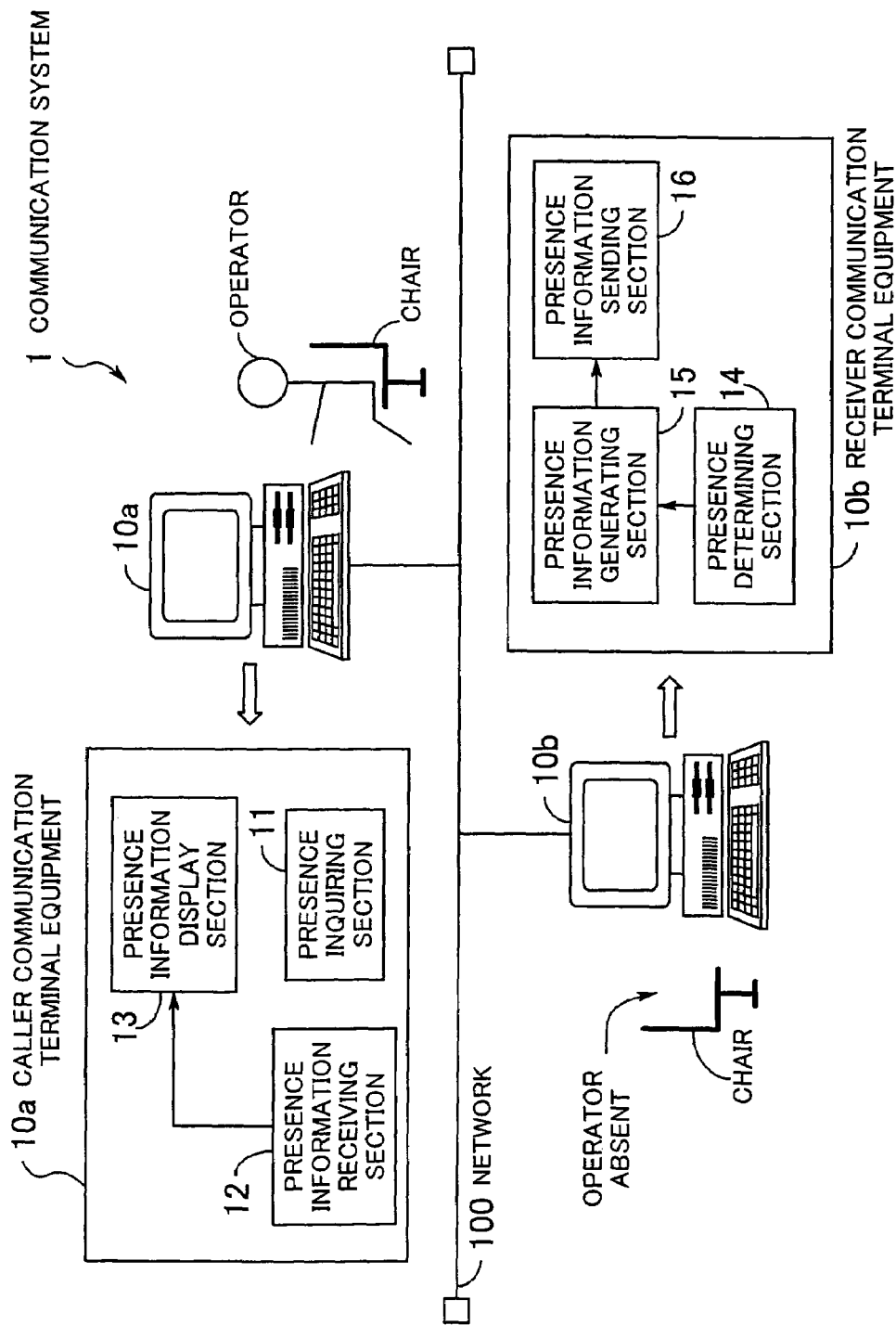
FIG. 1 is a diagram illustrating the principles of a communication system according to the present invention.

Preferred embodiments of the present invention will now be described with reference to the accompanying drawings. FIG. 1 is a diagram illustrating the principles of a communication system according to this invention. A communication system 1 comprises a caller communication terminal equipment 10a and a receiver communication terminal equipment 10b which are to be connected to a network 100. The communication system 1 executes communication control on information which indicates whether or not a terminal operator is present.

The caller communication terminal equipment 10a includes a presence inquiring section 11 which inquires the receiver communication terminal equipment 10b about the presence state of a communicating party. A presence information receiving section 12 receives presence information of the communicating party from the receiver communication terminal equipment 10b. A presence information display section 13 displays the received presence information.

In the receiver communication terminal equipment 10b, a presence determining section 14 determines the presence state of an operator indicating whether or not the operator is present. A presence information generating section 15 generates presence information based on the presence state. A presence information sending section 16 sends the presence information to the caller communication terminal equipment 10a.

Although the individual constituting sections are distributed to the caller communication terminal equipment 10a and the receiver communication terminal equipment 10b in the diagram, the constituting sections of both the caller communication terminal equipment 10a and receiver communication terminal equipment 10b are actually included in a single communication terminal equipment.

Although only two communication terminal equipments are connected on the network 100 to exchange presence information in the illustration, an arbitrary number of communication terminal equipments are actually linked together so that the above-described communication control is carried out among those communication terminal equipments.

Figure 2:
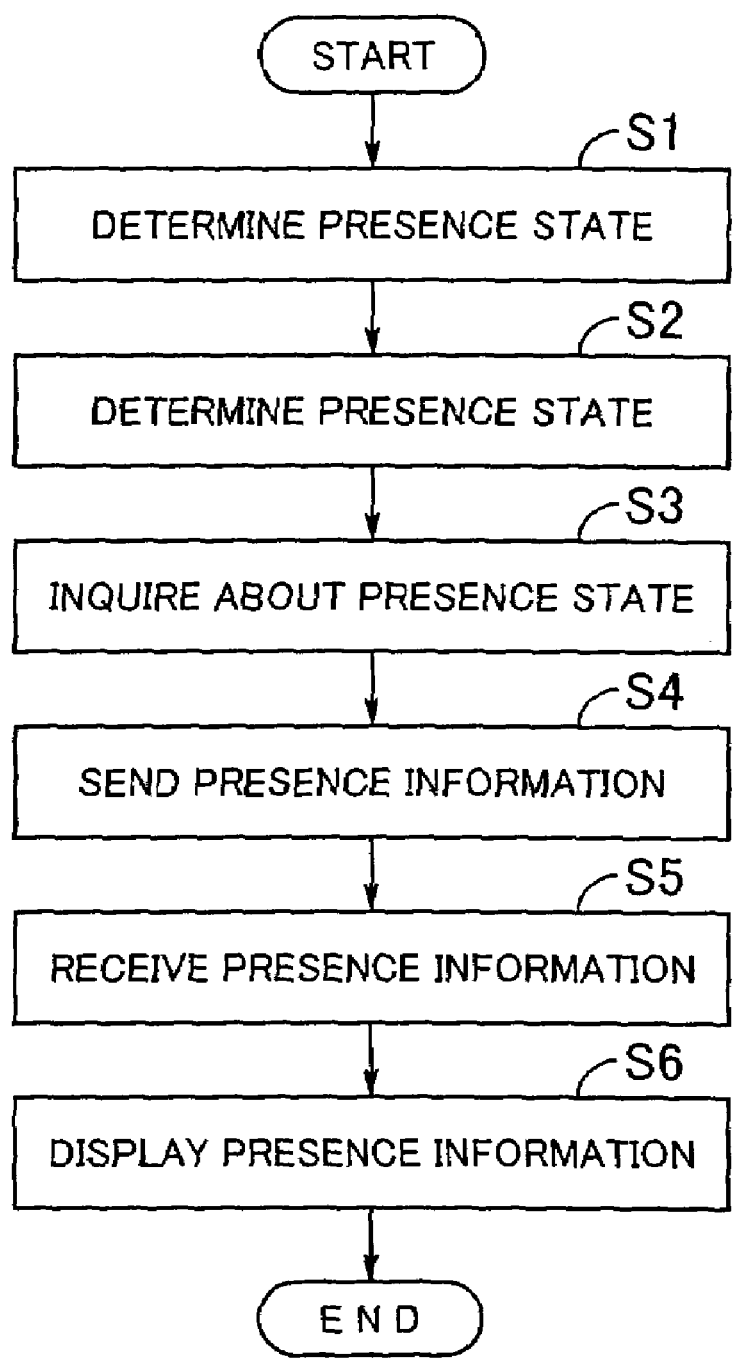
FIG. 2 is a flowchart illustrating the operation of the communication system.

The operation of the communication system 1 will now be described with reference to FIG. 2 which is a flowchart illustrating the operation of the communication system 1.

(S1) The presence determining section 14 determines the presence state of an operator of the local equipment, i.e., determines whether or not the operator is present.

(S2) The presence information generating section 15 generates presence information based on the presence state.

(S3) The presence inquiring section 11 makes an inquiry about the presence state of a communication destination or a communicating party.

(S4) The presence information sending section 16 sends the presence information of the receiver communication terminal equipment 10b to the caller communication terminal equipment 10a.

(S5) The presence information receiving section 12 receives the presence information from the receiver communication terminal equipment 10b.

(S6) The presence information display section 13 displays the received presence information. As the operator of the receiver communication terminal equipment 10b is not present in FIG. 1, information indicating the operator's being absent is displayed on the screen of the caller communication terminal equipment 10a.

A description will now be given of a field to which the communication system 1 of this invention is adaptable. Recently, there are growing needs for voice information to be integrated into IP (Internet Protocol) information to ensure voice communications (telephone capability) over an IP network.

The VoIP (Voice over IP) technique has appeared to meet the needs. The VoIP technique allows personal computers working as terminals to implement telephone communications over a LAN (Local Area Network) or Internet.

The VoIP technique can convert voice information to IP packets so that voice information can be communicated over an IP network. Provided that the IP address information of a communicating party is known, voice communications can be established over the IP network.

The communication system 1 of this invention is adaptable to a network system using the aforementioned VoIP communication technique. Specifically, the network 100 shown in FIG. 1 corresponds to an IP network, the caller communication terminal equipment 10a corresponds to a caller VoIP communication terminal equipment having a VoIP capability and the receiver communication terminal equipment 10b corresponds to a receiver VoIP communication terminal equipment having a VoIP capability.

In the following description, the caller communication terminal equipment 10a and caller VoIP communication terminal equipment, which are communication terminal equipments on the calling end, are each called "caller terminal 10a", the receiver communication terminal equipment 10b and receiver VoIP communication terminal equipment, which are communication terminal equipments on the receiving end, are each called "receiver terminal 10b", and the caller terminal 10a and receiver terminal 10b are generically called "communication terminal 10".

A description will now be given of the case where the presence or absence of an operator is checked based on whether or not a response comes from the receiver terminal 10b. In the case where the caller terminal 10a makes an inquiry to the receiver terminal 10b, the caller terminal 10a judges that the operator is present when receiving a response to the inquiry from the receiver terminal 10b (judges the operator as being present when the power of the receiver terminal 10b is ON), but judges that the operator is absent when receiving no response to the inquiry from the receiver terminal 10b (judges the operator as being absent when the power-OFF state of the receiver terminal 10b is detected).

Figure 3:
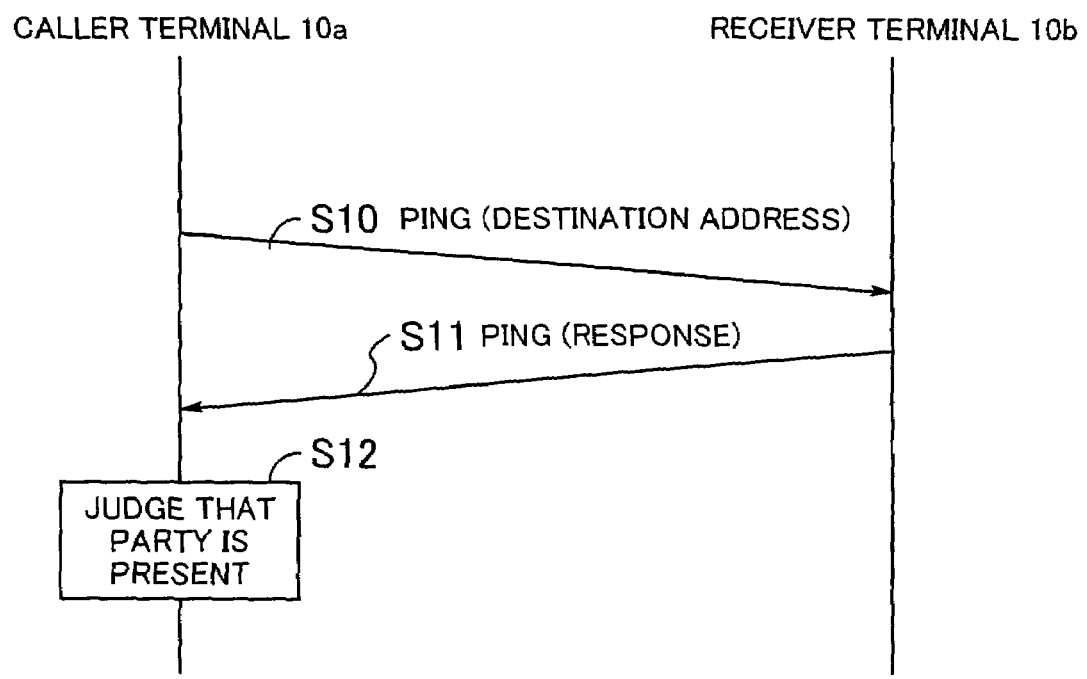
FIG. 3 is a diagram showing a power cutoff detection sequence.

FIG. 3 shows a power cutoff detection sequence. The sequence is in the case where a PING packet is used for an inquiry packet and the power of the receiver terminal 10b is ON.

(S10) The caller terminal 10a affixes the address of the receiver terminal 10b to a PING packet and sends the PING packet.

(S11) The receiver terminal 10b returns a response PING packet.

(S12) The caller terminal 10a judges that the operator of the receiver terminal 10b is present.

The "PING packet" is a test packet for checking the connection between the caller terminal 10a and the receiver terminal 10b, one of ICMP (Internet Control Message Protocol) packets that are defined by the IETF (Internet Engineering Task Force).

When the receiver terminal 10b returns a PING packet response to a PING packet sent from the caller terminal 10a, the caller terminal 10a determines that the operator of the receiver terminal 10b is present. The presence information display section 13 displays information indicating the presence of the operator on the screen of the caller terminal 10a.

Figure 4:
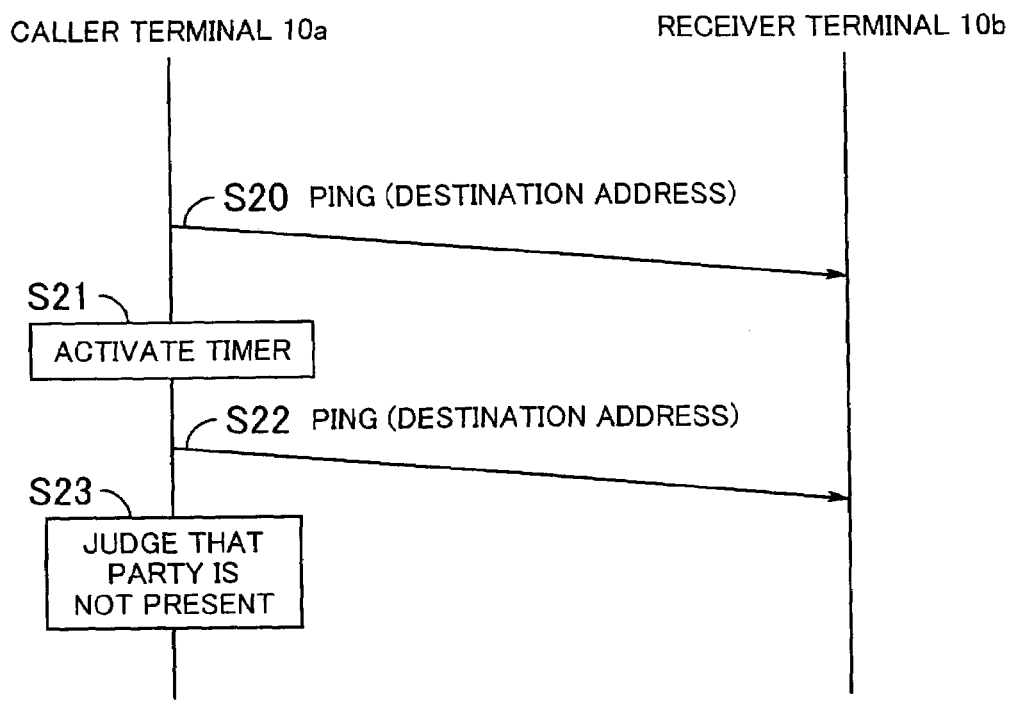
FIG. 4 is a diagram showing another power cutoff detection sequence.

FIG. 4 shows another power cutoff detection sequence. This sequence is in the case where a PING packet is used for an inquiry packet and the power of the receiver terminal 10b is OFF.

(S20) The caller terminal 10a affixes the address of the receiver terminal 10b to a PING packet and sends the PING packet.

(S21) The caller terminal 10a activates a timer, which measures the time elapsed until the reception of a response PING packet since the transmission of the inquiry PING packet.

(S22) When timeout occurs, the caller terminal 10a resends a PING packet.

(S23) When timeout has occurred a set number of times (i.e., when there is no response to the set number of PING packets resent), the caller terminal 10a judges that the operator of the receiver terminal 10b is absent.

When no PING packet response has been made to a PING packet sent from the caller terminal 10a from the receiver terminal 10b within a predetermined time, the caller terminal 10a determines that the operator of the receiver terminal 10b is absent. The presence information display section 13 displays information indicating the absence of the operator on the screen of the caller terminal 10a.

Although PING packets are used to check the presence/absence of the operator of the receiver terminal 10b in the foregoing description, signals other than PING packets, such as ring control packets defined by H.323 or the like (e.g., a SETUP packet and its response or ACK packet, or an ARP packet and its response or ACK packet) or unique inquiry packets may be used as well.

The following discusses the case of checking whether the operator of the receiver terminal 10b is present or absent based on the active duration of a screen saver and no-entry duration. The presence determining section 14 measures the active time of the screen saver of the communication terminal 10 and judges that the operator of the receiver terminal 10b is absent when the active time exceeds a given time.

The presence determining section 14 also measures the time over which no input operation of the input section of the communication terminal 10, such as a keyboard or a mouse, has been performed (no-entry duration) and judges that the operator of the receiver terminal 10b is absent when the no-entry duration continues more than a given time.

Figure 5:
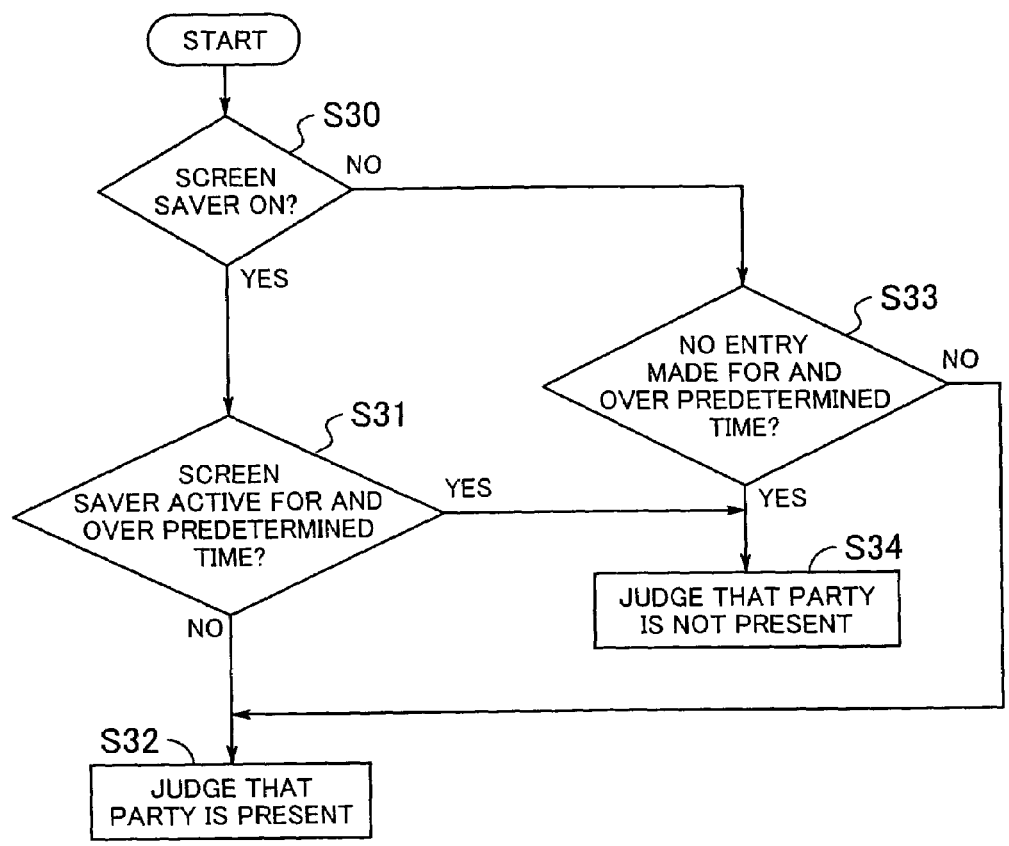
FIG. 5 is a flowchart illustrating procedures of detecting a presence state or absence state based on the active duration of a screen saver and no-entry duration.

FIG. 5 is a flowchart illustrating procedures of detecting the presence state or absence state based on the active duration of the screen saver and no-entry duration.

(S30) The presence determining section 14 determines if the screen saver of the local terminal is active. If the screen saver is ON, the presence determining section 14 goes to step S31. The presence determining section 14 proceeds to step S33 otherwise.

(S31) The presence determining section 14 determines if the active duration of the screen saver has exceeded a predetermined time. If the active duration time has passed the predetermined time, the presence determining section 14 proceeds to step S34. The presence determining section 14 proceeds to step S32 otherwise.

(S32) The presence determining section 14 judges that the operator of the receiver terminal 10b is present.

(S33) The presence determining section 14 determines if the no-entry duration time has exceeded a predetermined time. If the no-entry duration time has passed the predetermined time, the presence determining section 14 proceeds to step S34. The presence determining section 14 proceeds to step S32 otherwise.

(S34) The presence determining section 14 judges that the operator of the receiver terminal 10b is absent.

The presence information generating section 15 generates presence information indicating the presence/absence that has been determined based on the aforementioned active duration of the screen saver and no-entry duration. The presence information sending section 16 sends the presence information to the caller terminal 10a.

The presence information receiving section 12 in the caller terminal 10a receives the presence information which is in turn displayed on the screen by the presence information display section 13.

A description will now be given of the case of checking if a terminal operator is present by detecting the load of the operator. The presence determining section 14 judges the presence state based on a given or higher load pressure which is detected by a pressure sensor installed in the floor near the operator.

Figure 6:
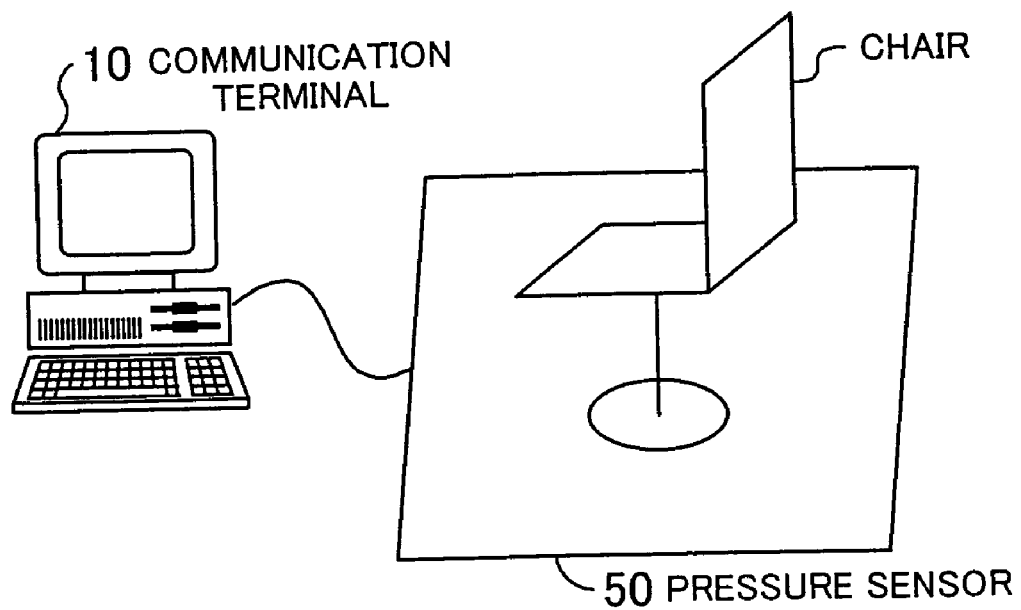
FIG. 6 is a conceptual diagram showing the case where a pressure sensor is used.

FIG. 6 is a conceptual diagram showing the case where the pressure sensor is used. As illustrated, a floor type simple pressure sensor 50 (a multi-contact switch or the like which is not switched on unless a given or higher load pressure is applied) is connected to the communication terminal 10 to detect the presence state of the operator. Another available sensor is a chair-mounting type sensor. This sensor requires that a chair be connected to the communication terminal 10 by a wire, and may thus raise a problem when the operator is seated. The floor type pressure sensor 50 can avoid such a problem.

A message control section will be discussed below. The message control section, which is included in the communication terminal 10, stores plural patterns of messages to be sent to a communicating party. The message control section transmits a selected one of the messages.

Figure 7:
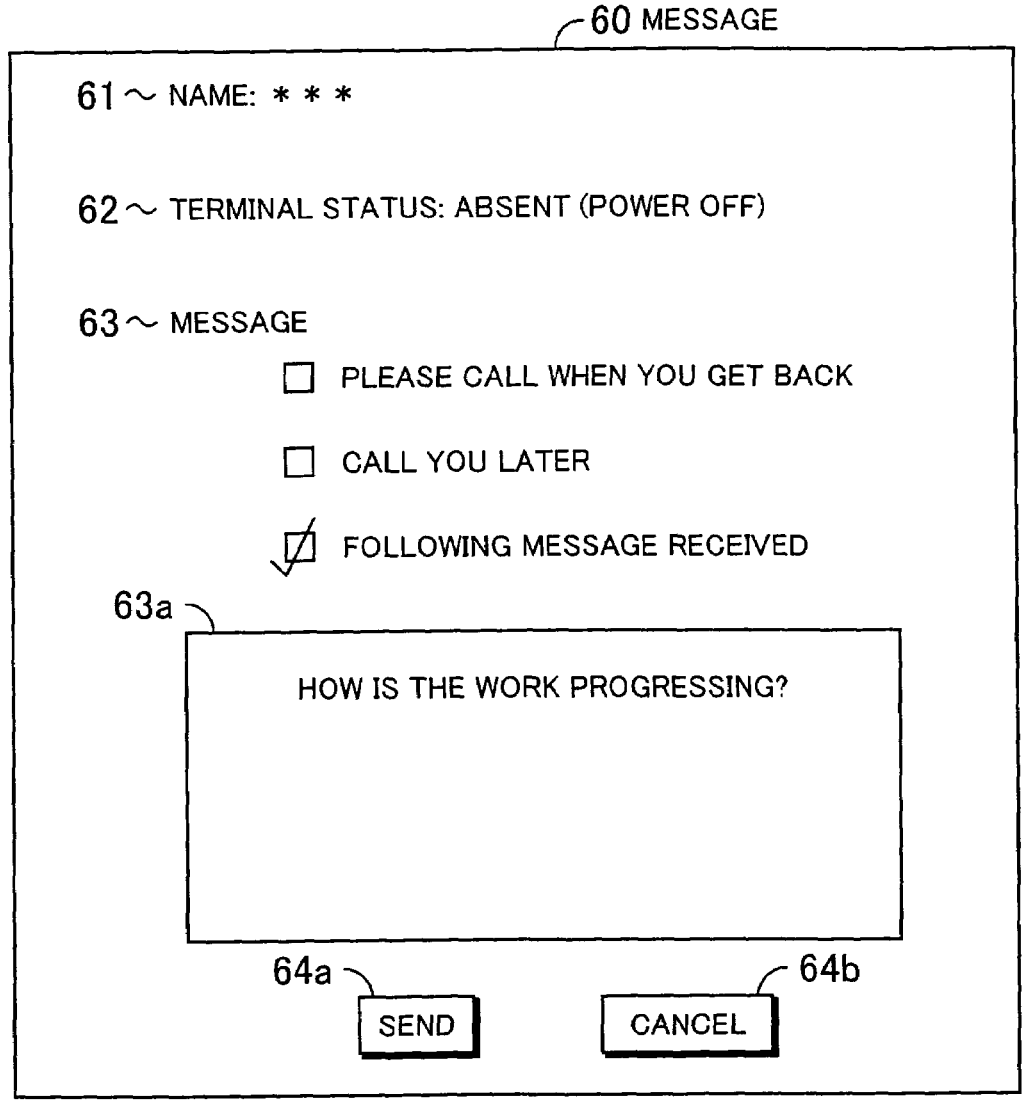
FIG. 7 is a diagram showing an example of a message.

FIG. 7 shows an example of a message. A message 60 shown in FIG. 7 has items including a name 61 of a communicating party, a terminal status 62 which indicates the status of the destination terminal to which an inquiry about presence information is made and a message 63.

The message control section stores a plurality of fixed message patterns like the message 60. When "FOLLOWING MESSAGE RECEIVED" in the message 63 is selected, a detailed message can be written in a details column 63a.

To send the message 60 to the destination terminal, a button 64a should be selected. Selecting a button 64b cancels the message 60.

Figure 8:
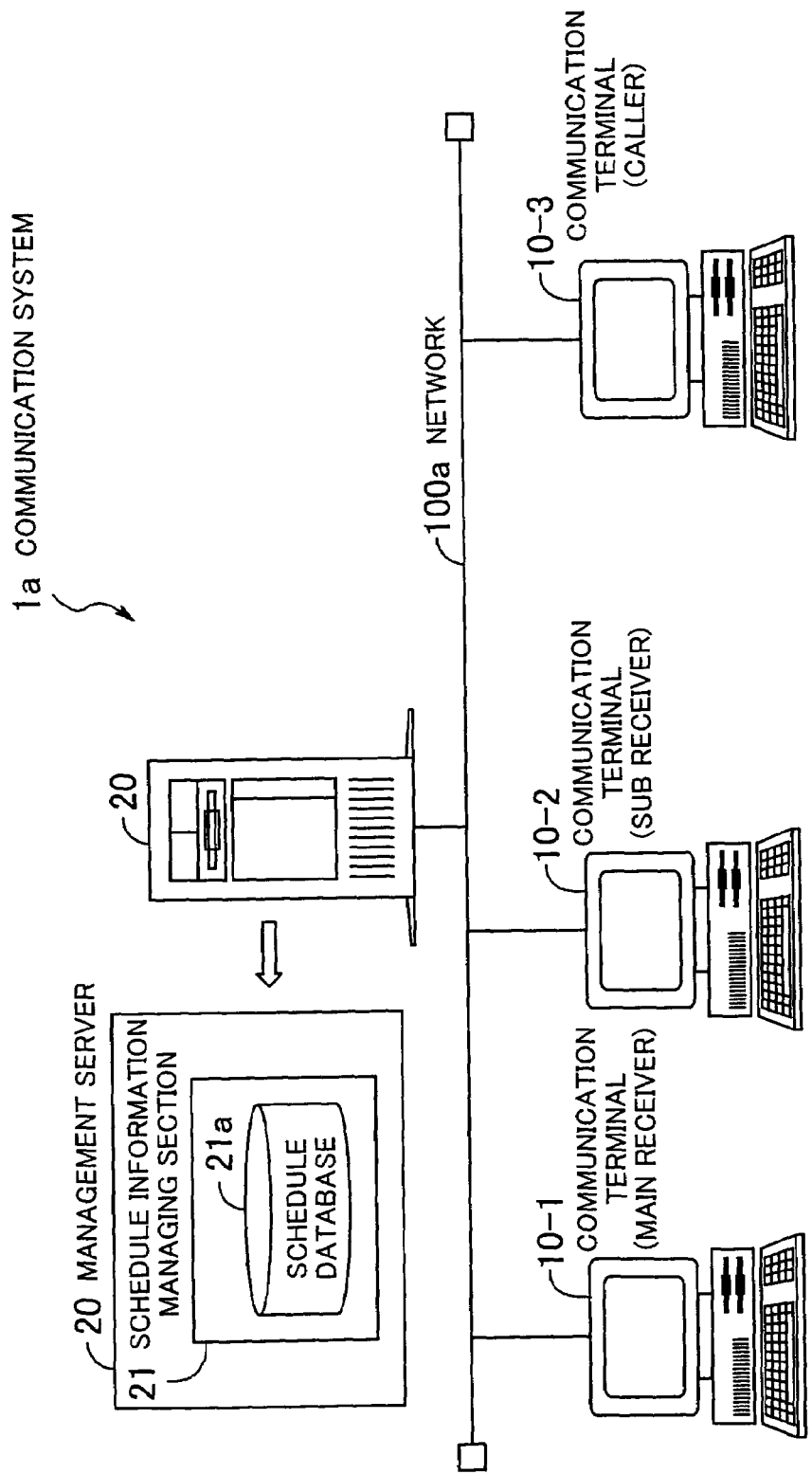
FIG. 8 is a diagram depicting the structure of the communication system.

The communication system of this invention which includes a management server will be discussed below. FIG. 8 illustrates the structure of such a communication system. A communication system 1a has communication terminals 10-1 to 10-3 with a VoIP capability connected on a network 100a which is an IP network. In the communication system 1a, a management server 20 which controls the VoIP is also connected to the network 100a. Actually, any number of communication terminals are connectable to the network 100a.

Each of the communication terminals 10-1 to 10-3 has the above-described constituting sections of the communication terminal 10. The management server 20 includes a schedule information managing section 21. The schedule information managing section 21 manages schedule information (e.g., schedule information for each terminal operator, such as "absent from 15:00 to 16:00 on February 9") of the operator of each of the communication terminals 10-1 to 10-3 and transmits and receives schedule information. The schedule information is stored in a schedule database 21a.

A description will now be given of the control operation of the communication system 1a in FIG. 8 in multiline reception mode. The multiline reception capability is a PBX service that allows a communication terminal 10-2 which is a sub receiver (corresponding to a secretary or the like of a main receiver) to also receive a call that has been made to the communication terminal 10-1 or the main receiver from the communication terminal 10-3 which is the caller.

The schedule information managing section 21 in this invention sends the schedule information of the main receiver to the communication terminal (sub receiver) 10-2 in multiline reception mode.

Figure 9:
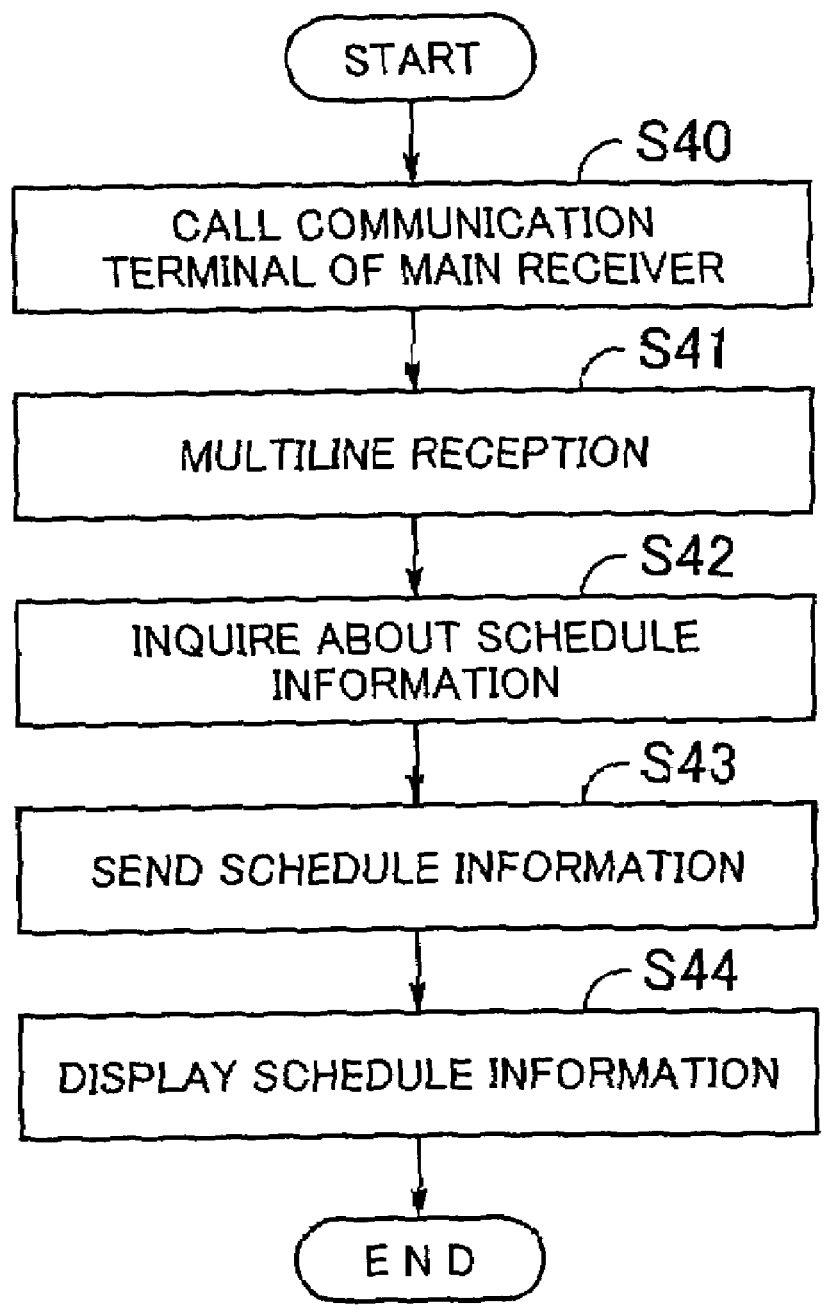
FIG. 9 is a flowchart illustrating the operation of the communication system in multiline reception mode.

FIG. 9 is a flowchart illustrating the operation of the communication system 1a in multiline reception mode. Suppose that a main receiver is absent when the communication terminal (caller) 10-3 has made a call to the communication terminal (main receiver) 10-1.

(S40) The communication terminal (caller) 10-3 calls the communication terminal (main receiver) 10-1.

(S41) The call is made in multiline to both the communication terminal (main receiver) 10-1 and the communication terminal (sub receiver) 10-2 as a PBX service.

(S42) The sub receiver makes a off-hook operation. Then, the communication terminal (sub receiver) 10-2 accesses the management server 20 to designate the address of the communication terminal (main receiver) 10-1 and make an inquiry about the schedule information of the main receiver.

(S43) The schedule information managing section 21 sends the schedule information of the communication terminal (main receiver) 10-1 to the communication terminal (sub receiver) 10-2.

(S44) The communication terminal (sub receiver) 10-2 displays the acquired schedule information on the screen.

FIG. 10 exemplifies schedule information. Schedule information 70 in the diagram has items, such as the caller, the receiver, the terminal status, the schedule of the main receiver and the emergency phone number of the main receiver.

In multiline reception mode, the communication terminal (sub receiver) 10-2 can acquire the schedule information of the main receiver from the management server 20. Therefore, the sub receiver can adequately inform the caller of the schedule of the main receiver, thus ensuring efficient works.

A description will now be given of the control operation of the communication system 1a in FIG. 8 in pickup response mode. The pickup capability is a PBX service that allows the communication terminal 10-2 which is a sub receiver to respond to a call that has been made to the communication terminal 10-1 or the main receiver from the communication terminal 10-3 or the caller.

The schedule information managing section 21 in this invention sends the schedule information of the main receiver to the communication terminal (sub receiver) 10-2 which has made a pickup response.

Figure 11:
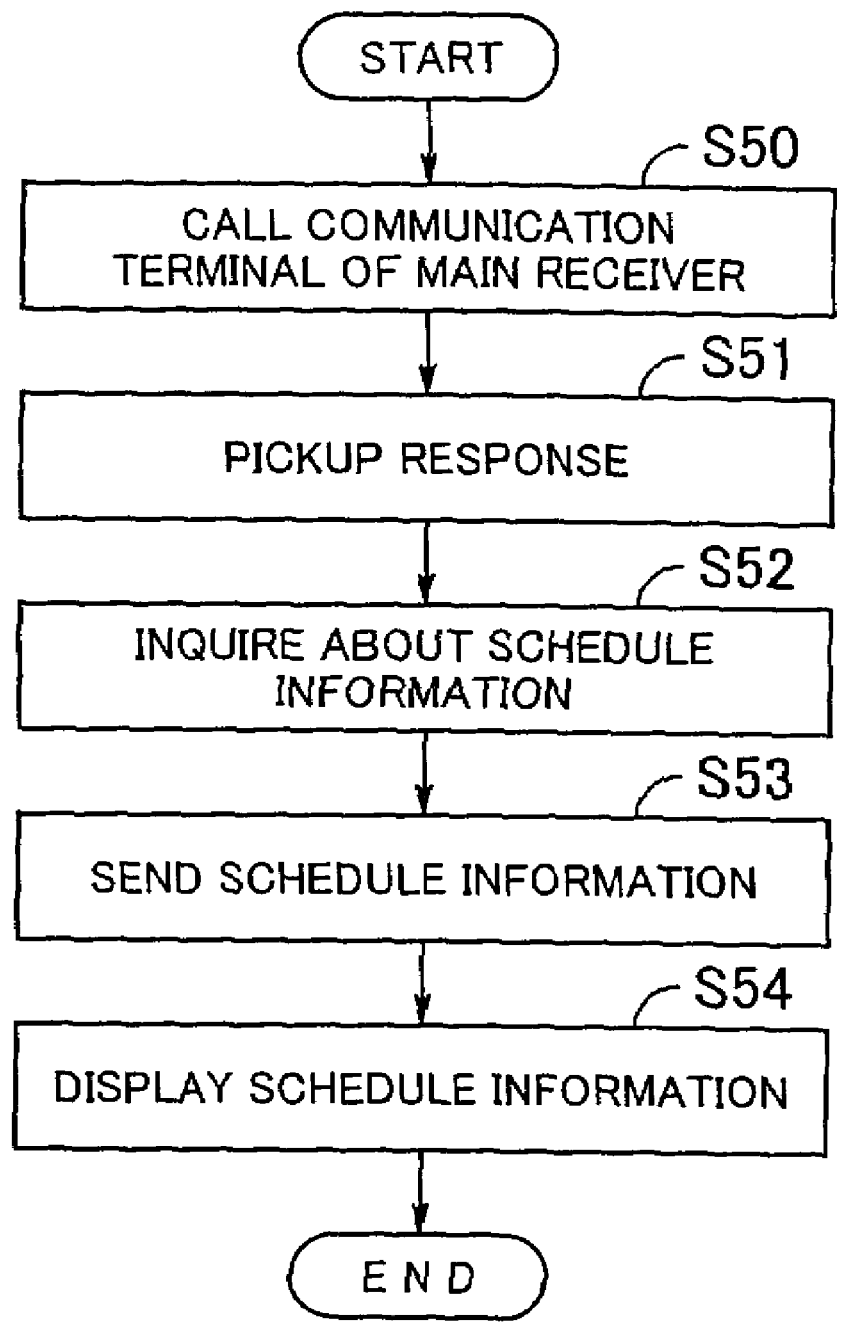
FIG. 11 is a flowchart illustrating the operation of the communication system in pickup response mode.

FIG. 11 is a flowchart illustrating the operation of the communication system 1a in pickup response mode. It is assumed that a main receiver is absent when the communication terminal (caller) 10-3 has made a call to the communication terminal (main receiver) 10-1.

(S50) The communication terminal (caller) 10-3 calls the communication terminal (main receiver) 10-1.

(S51) The communication terminal (sub receiver) 10-2 picks up the call made to the communication terminal (main receiver) 10-1.

(S52) The communication terminal (sub receiver) 10-2 accesses the management server 20 to designate the address of the communication terminal (main receiver) 10-1 and make an inquiry about the schedule information of the main receiver.

(S53) The schedule information managing section 21 sends the schedule information of the communication terminal (main receiver) 10-1 to the communication terminal (sub receiver) 10-2 or the responder.

(S54) The communication terminal (sub receiver) 10-2 displays the acquired schedule information on the screen.

In pickup response mode, the communication terminal (sub receiver) 10-2 can acquire the schedule information of the main receiver from the management server 20, so that the sub receiver can adequately inform the caller of the schedule of the main receiver. This can ensure efficient works.

An automatic presence-notification section will be discussed below. The automatic presence-notification section is included in the communication terminal 10. When the state of the operator has changed from an absence state to a presence state, the automatic presence-notification section automatically notifies that status change to the caller who has called while the receiver is absent.

Figure 12:
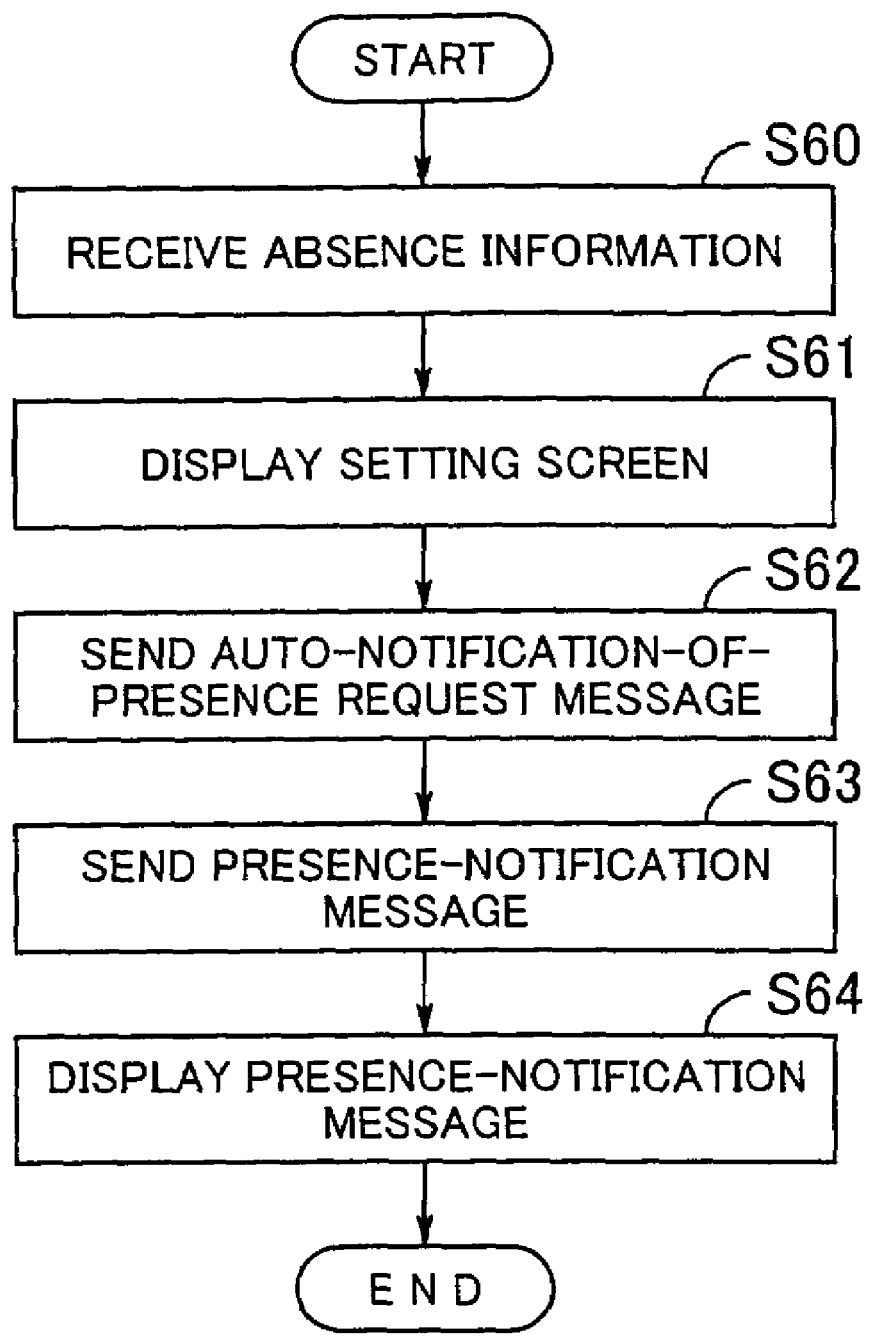
FIG. 12 is a flowchart illustrating the operation of a calling terminal which is associated with automatic notification of a presence state.

FIG. 12 is a flowchart illustrating the operation of a calling terminal which is associated with automatic notification of the presence state.

(S60) The caller terminal 10a receives presence information indicating that a communicating party is absent.

(S61) The caller terminal 10a displays a menu for designating automatic notification of the presence of the operator upon the communicating party's being present.

(S62) When automatic notification of the presence of the operator is needed, the caller terminal 10a sends an auto-notification-of-presence request message to the receiver terminal 10b or the management server 20.

(S63) When receiving the auto-notification-of-presence request message from the caller terminal 10a or the management server 20, the receiver terminal 10b sends a presence-notification message to the caller terminal 10a or the management server 20 when the operator of the receiver terminal 10b becomes present.

(S64) The caller terminal 10a receives the presence-notification message sent from the caller terminal 10a or the management server 20 and displays it on the screen. This allows the operator of the caller terminal 10a to easily know the presence/absence information of the communicating party.

Figure 13:
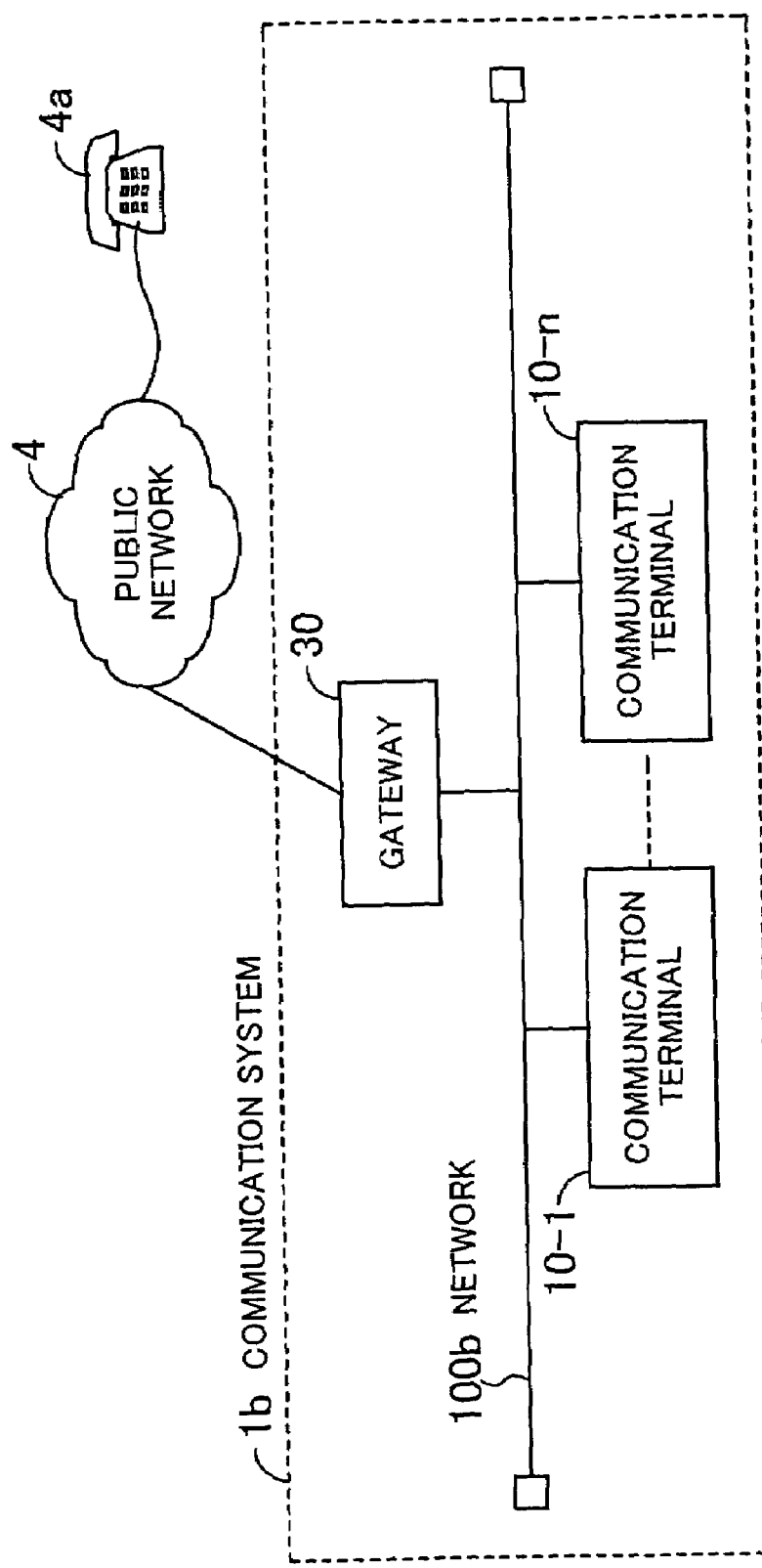
FIG. 13 is a diagram showing another structure of the communication system.

The following describes the system structure and the operation in the case where the communication system 1 is connected to an external network. FIG. 13 shows the structure of the communication system in this case.

A communication system 1b has a system structure that has communication terminals 10-1 to 10-n and a gateway 30 as a protocol converting unit connected to on a network 100b.

The gateway 30 connects an external public network 4 connected to a telephone 4a to the network 100b, and performs protocol conversion between the public network 4 and the network 100b to exchange data with the networks 4 and 100b. The management server 20, though not illustrated, may be connected to the network 100b.

Figure 14:
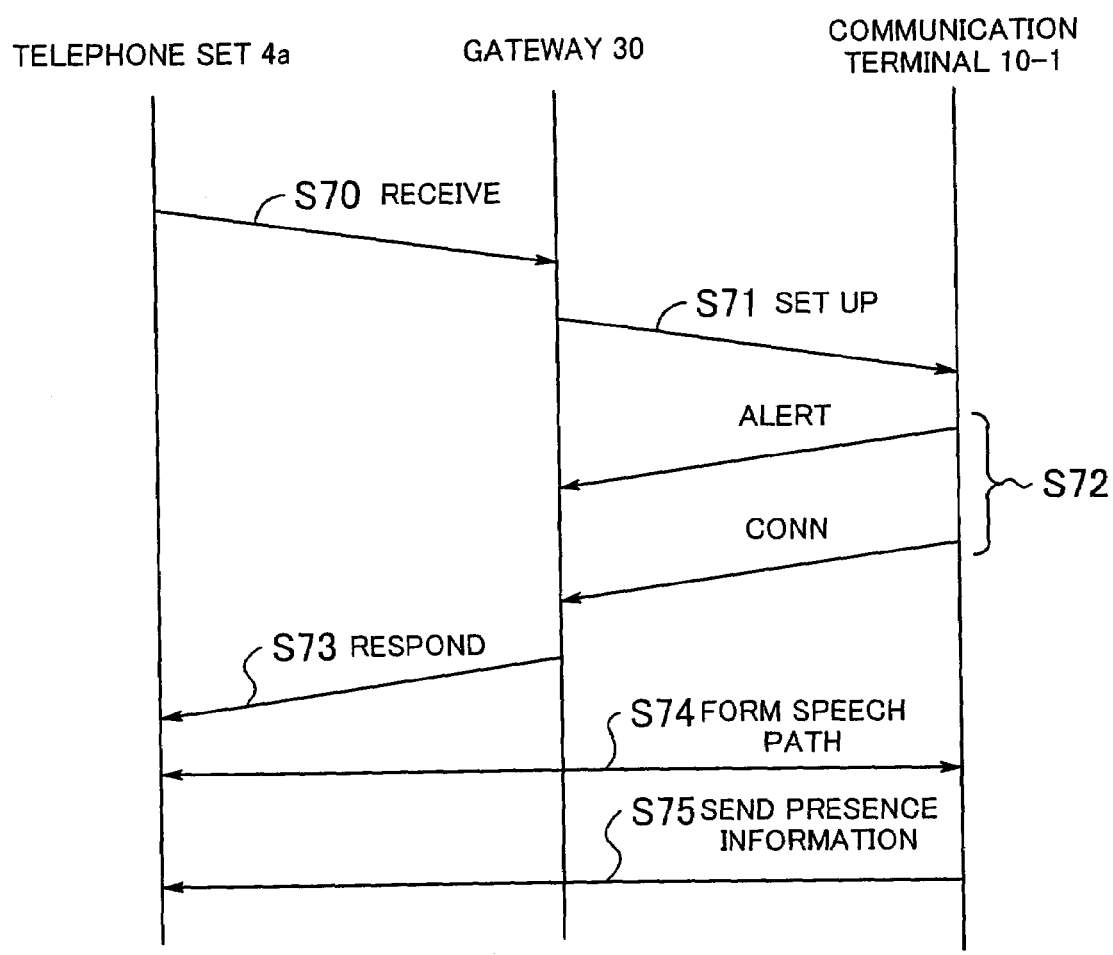
FIG. 14 is a diagram exemplifying a sequence in the case where a call is made to a communication terminal over a public network.

FIG. 14 shows a sequence in the case where a call is made to the communication terminal 10-1 over the public network 4 when the power of the communication terminal 10-1 is ON.

(S70) The gateway 30 receives a call from the telephone 4a.

(S71) The gateway 30 sends SETUP to the communication terminal 10-1. It is assumed that the network 100b is a LAN network having a TCP (Transmission Control Protocol).

(S72) As the communication terminal 10-1 receives SETUP which is incoming call information from the gateway 30, it judges that the communicating party is an external terminal. The communication terminal 10-1 then sends ALERT and CONN to the gateway 30.

(S73) The gateway 30 sends an acknowledge signal to the telephone 4a.

(S74) A speech path is formed between the telephone 4a and the communication terminal 10-1.

(S75) The communication terminal 10-1 edits presence information indicating whether or not the communicating party is present into a voice message and sends the message to the telephone 4a via the gateway 30.

Although presence information is converted to a voice message as the external terminal is an ordinary telephone 4a in the foregoing description, presence information can be transmitted directly without edition if the external terminal is a personal computer or the like.

Figure 15:
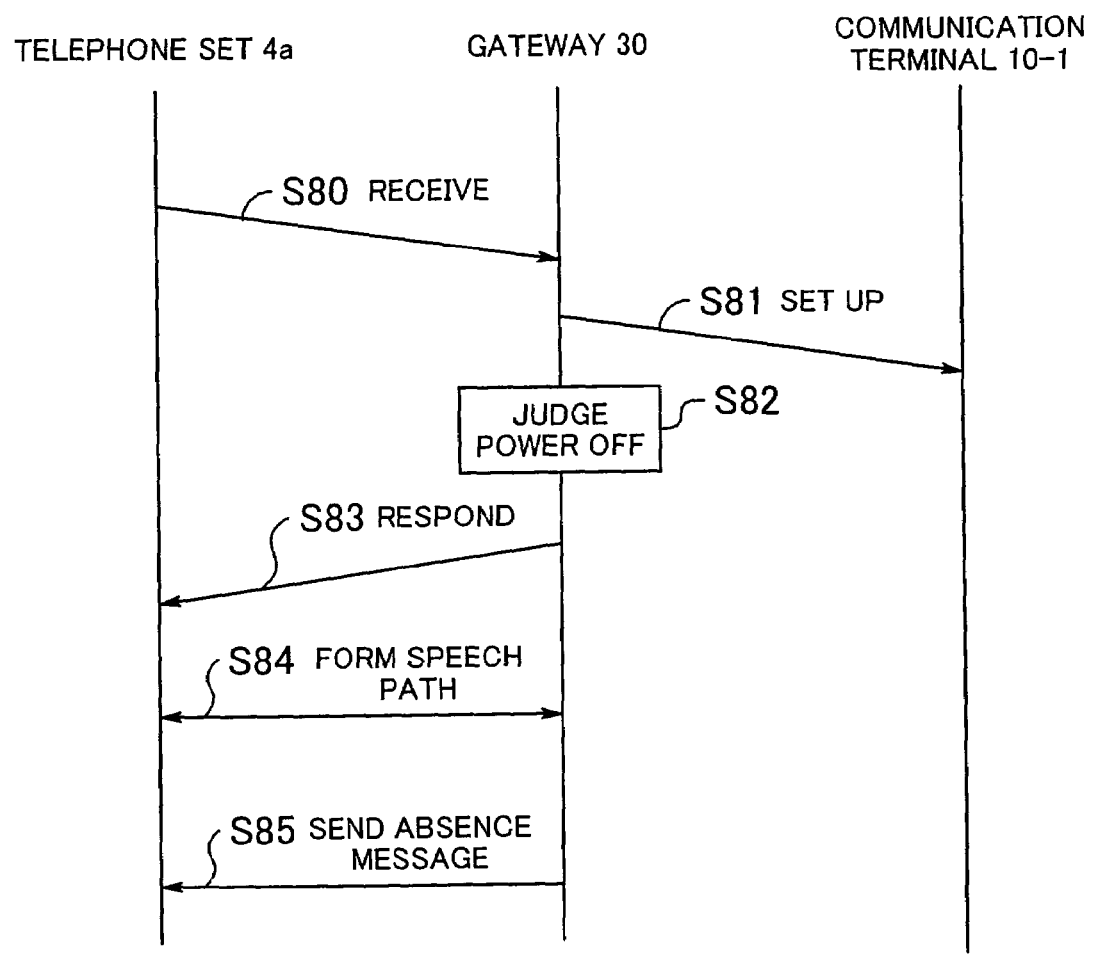
FIG. 15 is a diagram showing another sequence in the case where a call is made to a communication terminal over a public network.

FIG. 15 shows a sequence in the case where a call is made to the communication terminal 10-1 over the public network 4 when the power of the communication terminal 10-1 is OFF.

(S80) The gateway 30 receives a call from the telephone 4a.

(S81) The gateway 30 sends SETUP to the communication terminal 10-1.

(S82) As there is no response from the communication terminal 10-1, the gateway 30 judges that the power of the communication terminal 10-1 is OFF.

(S83) The gateway 30 sends an acknowledge signal to the telephone 4a.

(S84) A speech path is formed between the telephone 4a and the gateway 30.

(S85) The gateway 30 sends an absence message to the telephone 4a.

A description will now be given of the control on schedule information when a communicating party is an outsider. The schedule information managing section 21 of the management server 20 sends schedule information for outsiders when judging that a communicating party is an outsider.

The "schedule information for outsiders" is schedule information constructed only by information which may be made public to those outside a company, such as the expected time of return, an emergency phone number and the name of a person in charge, as opposed to ordinary schedule information which contains detailed business information.

Figure 16:
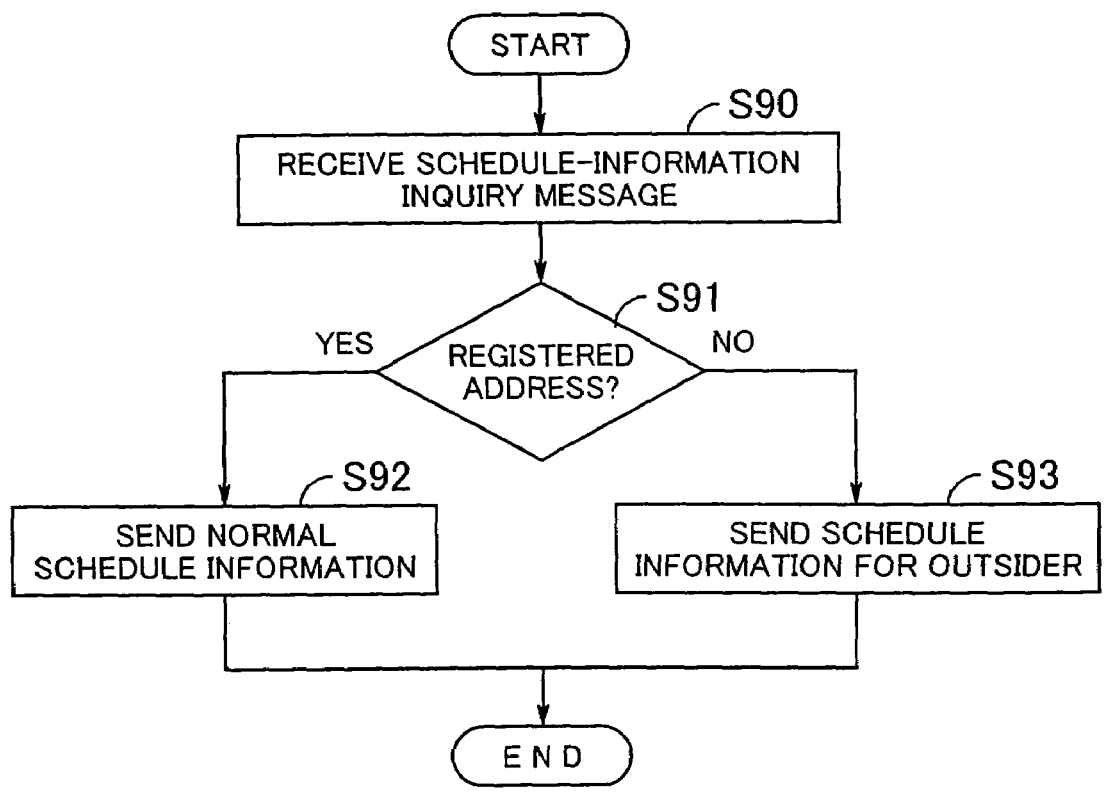
FIG. 16 is a flowchart illustrating procedures of sending schedule information.

FIG. 16 is a flowchart illustrating procedures of sending schedule information.

(S90) The schedule information managing section 21 receives a schedule-information inquiry message.

(S91) The schedule information managing section 21 proceeds to step S92 when the caller address in the schedule-information inquiry message is a registered address (e.g., an address in the office), but goes to step S93 otherwise.

(S92) The schedule information managing section 21 sends ordinary schedule information to the caller.

(S93) The schedule information managing section 21 judges that the caller as an outsider and sends schedule information for outsiders to the caller.

The control that is performed while the line of the communicating party is busy will be discussed below. The foregoing description has been given on the control that is associated with the presence/absence state of the communicating party. However, the communication system embodying this invention can also be adapted to the control that is associated with whether or not the communicating party is busy.

Figure 17:
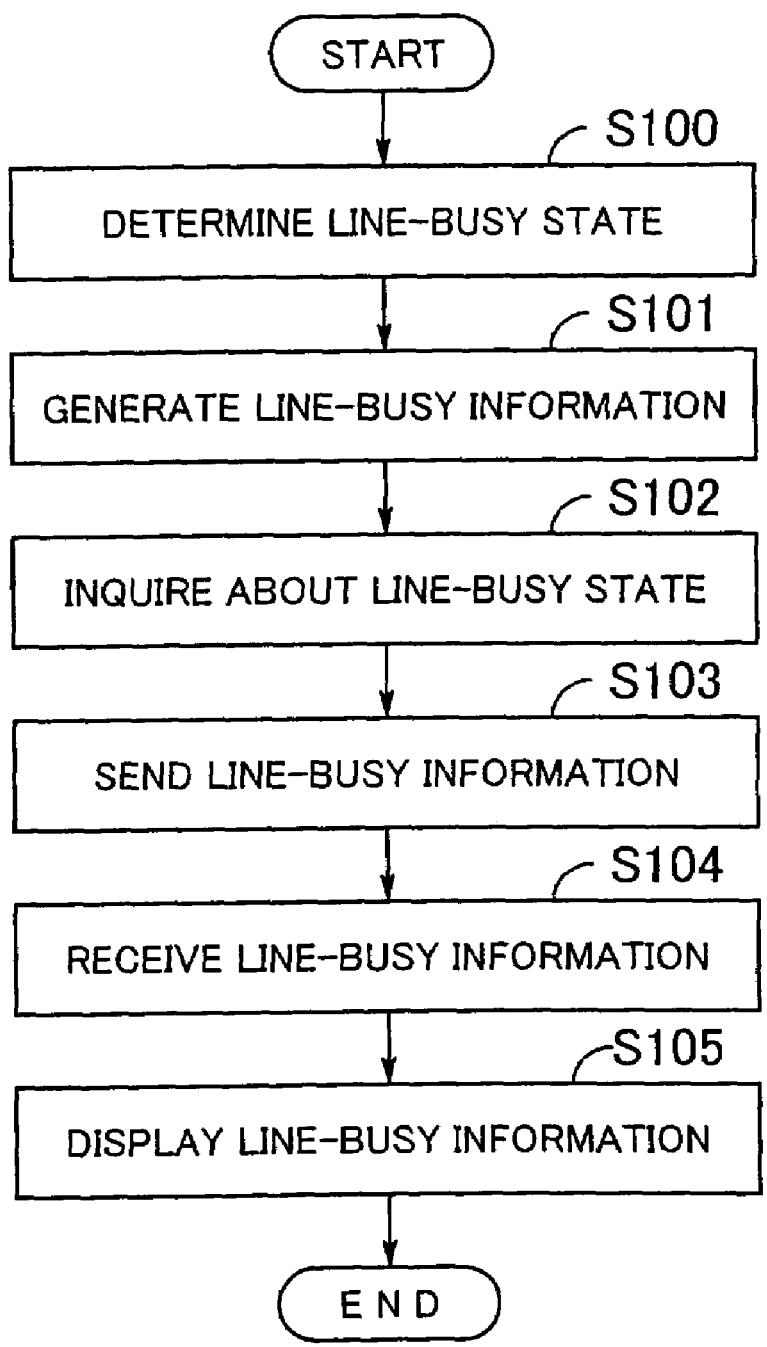
FIG. 17 is a flowchart illustrating the control operation of the communication system when the line is busy.

FIG. 17 is a flowchart illustrating the control operation of the communication system 1 that is carried out when the line is busy.

(S100) The receiver terminal 10b determines if the operator of the local terminal is busy.

(S101) Based on the line-busy state, the receiver terminal 10b generates line-busy information.

(S102) The caller terminal 10a inquires about the busy state of the communicating party.

(S103) The receiver terminal 10b sends line-busy information to the caller terminal 10a.

(S104) The caller terminal 10a receives the line-busy information of the communicating party from the receiver terminal 10b.

(S105) The caller terminal 10a displays the received line-busy information.

Although communication control in line-busy mode is carried out between terminals in the foregoing description, the management server 20 may send the line-busy information of the receiver terminal 10b to the caller terminal 10a.

When the caller terminal 10a designates a communicating party, for example, the management server 20 sends the line-busy information of the receiver terminal 10b or the communicating party to the caller terminal 10a. This makes it unnecessary for the caller terminal 10a to execute a wasteful calling operation, thus improving the operability of terminals.

Figure 18:
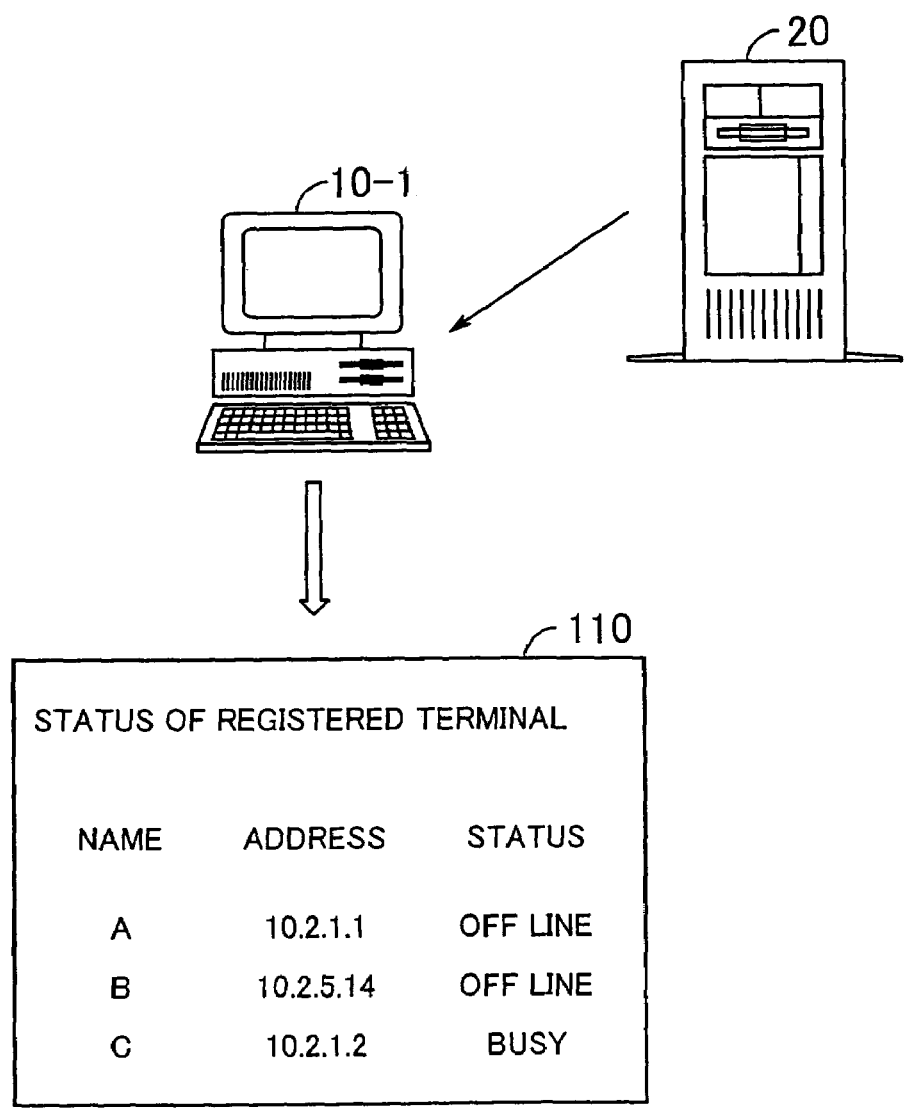
FIG. 18 is a diagram showing how updated contents are sent to a registered communication terminal.

A description will now be given of the control of the management server 20 to update management information. FIG. 18 illustrates how updated contents are sent to a registered communication terminal 10. The management server 20 regularly inquires about the presence state and/or the line-busy state of the communication terminals 10-1 to 10-n, updates the management information and transmits the updated contents to the registered communication terminals 10.

The operator of the communication terminal 10 can arbitrarily set a party whose updated contents the operator wants to know. For example, the operator of the illustrated communication terminal 10-1 has designated three persons A, B and C whose updated contents the operator wants to know, and the presence states and line-busy states of the three persons A, B and C are displayed on the screen.

As apparent from the foregoing description, the communication system of this invention allows a terminal to manage the presence state of a terminal operator and know the status of a destination terminal through information exchange that is performed when a telephone call is made. This invention can therefore realize a presence notifying system at a low cost and can improve the operability.

Further, the presence state of a terminal operator can be detected based on the ON/OFF power state of a terminal, the active duration of a screen saver, the no-entry duration and the detected information form a pressure sensor. This feature can facilitate notification of the presence state of a terminal operator and can increase the precision in judging the presence state of a terminal operator.

When a communicating party is absent, a message can be left with a simple operation. This results in an improved serviceability. Further, a caller can acquire information about the schedule of a communicating party, the emergency telephone number and a person in charge, when the communicating party is not present. This further improves the serviceability.

In multiline reception mode or pickup response mode, the schedule information of a main receiver is displayed to increase the attendance or service efficiency and shortening the working time.

As schedule information to be sent when a receiver is absent can be changed according to a caller, it is possible to provide a security measure against leakage of in-company-only confidential information.

As the automatic presence-notification section allows a caller to know in real time when a communicating party is present. This further improves the serviceability when a caller want to establish sure communication with a communicating party.

In short, the communication system of this invention is so designed as to allow communication terminals to judge the presence state of a communicating party, inquire about presence information thereof and display the presence information. This design can permit each terminal to control presence information of other terminals and can thus improve the system flexibility and serviceability.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for performing communication control on information indicating whether or not a third party is present over a network, comprising:

a caller communication terminal equipment having presence inquiring means for making an inquiry to a receiver communication terminal about a presence state of a communicating party, presence information receiving means for receiving presence information from said receiver communication terminal and presence information display means for displaying said received presence information; and a receiver communication terminal equipment having presence determining means for determining said presence state of an operator of said receive communication terminal equipment, presence information generating means for generating said presence information and presence information sending means for sending said presence information upon reception of said inquiry, and wherein said caller communication terminal judges if the operator is present upon receiving said present information.

2. The communication system according to claim 1, wherein with respect to said inquiry, said caller communication terminal equipment acknowledges said communicating party's being present when receiving a response to said inquiry from said receiver communication terminal equipment and acknowledges said communicating party's being not present when receiving no response to said inquiry.

3. The communication system according to claim 1, further comprising message control means for storing messages of plural patterns and selecting a message to be sent to said communicating party and sending said selected message when said communicating party is not present.

4. The communication system according to claim 1, further comprising a management server including schedule information managing means for managing schedule information and performing transmission and reception of said schedule information.

5. The communication system according to claim 4, wherein said management server regularly inquires about a presence state or a line-busy state of said communicating party, updates management information and sends updated contents to a registered terminal.

6. The communication system according to claim 4, wherein said schedule information managing means sends schedule information of a main receiver to a sub receiver in multiline reception mode.

7. The communication system according to claim 4, wherein said schedule information managing means sends schedule information of a main receiver to a responder sub receiver in pickup response mode.

8. The communication system according to claim 4, wherein said schedule information managing means determines whether or not said communicating party is an outsider and sends schedule information for outsiders when said communicating party is an outsider.

9. The communication system according to claim 1, further comprising automatic presence-notification means for, when an absence state has changed to a presence state, automatically notifying that status change to a caller who has called during said absence state.

10. The communication system according to claim 1, wherein said receiver communication terminal equipment detects a line-busy state of said communicating party.

11. The communication system according to claim 10, wherein said caller communication terminal equipment displays information on said line-busy state of said communicating party.

12. The communication system according to claim 1, further comprising a protocol converting unit for connecting said network to an external network and sending presence information and line-busy information in response to a call made over said external network.

13. A communication terminal equipment for performing communication control on information indicating whether or not any third party is present over a network, comprising:
    caller communication terminal presence inquiring means for making an inquiry to a receiver communication terminal about a presence state of a communicating party;
    caller communication terminal presence information receiving means for receiving presence information from said receiver communication terminal;
    caller communication terminal presence information display means for displaying said received presence information;
    receiver communication terminal presence determining means for determining said presence state of an operator of said communication terminal equipment;
    receiver communication terminal presence information generating means for generating said presence information; and
    receiver communication terminal presence information sending means for sending said presence information to a caller communication terminal upon reception of said inquiry.

14. A method implemented in a caller communication terminal to indicate presence information associated with a receiver communication terminal comprising:
    (a) transmitting an inquiry querying a receiver communication terminal a presence state associated with said receiver communication terminal;
    (b) receiving said presence state associated with said receiver communication terminal, said received presence state selected from a group of check results, comprising: a result of a check for active duration of a screensaver at said receiver communication terminal, a result of a check for duration of non-entry of inputs at said receiver communication terminal, a result of a pressure sensor check indicating load of an operator at said receiver communication terminal, and a result of a schedule check performed in conjunction with a schedule database, and
    (c) rendering said received presence state of said receiver communication terminal in said caller communication terminal.

15. A method implemented in a caller communication terminal to indicate presence information associated with a receiver communication terminal, as per claim 14, wherein said caller communication terminal and receiver communication terminal are IP telephones communicating over an IP network.

16. A method implemented in a caller communication terminal to indicate presence information associated with a receiver communication terminal, as per claim 14, wherein said caller communication terminal is a non-IP telephone and said receiver communication telephone is an IP telephone, with said presence information modified as a voice message prior to being rendered in said caller communication terminal.

17. A method implemented in a caller communication terminal to indicate presence information associated with a receiver communication terminal, as per claim 14, wherein an operator at said receiver communication terminal is absent, said method comprises the additional step of initiating an auto-notification request instructing said receiver communication terminal to transmit a presence notification message when said operator is present.

18. A method implemented in a caller communication terminal to indicate presence information associated with a receiver communication terminal, as per claim 14, wherein, in a multiline reception more, said presence state associated with said receiver communication terminal is rendered at a sub-receiver.

19. A multiline reception method to indicate presence information associated with a receiver communication terminal comprising:
(a) receiving an inquiry querying said receiver communication terminal regarding presence of an operator;
(b) identifying presence information associated with an operator of said receiver communication terminal, said received presence information state selected from a group of checks, comprising: a result of a check for active duration of a screensaver at said receiver communication terminal, a result of a check for duration of non-entry of inputs at said receiver communication terminal, a result of a pressure sensor check indicating load of an operator at said receiver communication terminal, and a result of a schedule check performed in conjunction with a schedule database, and when said operator is absent,
(c) rendering said presence information to a sub-receiver communication terminal, said sub-receiver communication terminal part of the same communication network as said receiver communication terminal.

20. A multiline reception method to indicate presence information associated with a receiver communication terminal, as per claim 19, wherein said caller communication terminal, said receiver communication terminal, and said sub-receiver communication terminal are IP telephones communicating over an IP network.

\* \* \* \* \*